(12) United States Patent
Schafer et al.

(10) Patent No.: US 10,317,208 B2
(45) Date of Patent: Jun. 11, 2019

(54) TILT SENSOR

(71) Applicants: Philip Schafer, Heyburn, ID (US); Anton M Walters, Mountain Home, ID (US); Brent Muller, Boise, ID (US)

(72) Inventors: Philip Schafer, Heyburn, ID (US); Anton M Walters, Mountain Home, ID (US); Brent Muller, Boise, ID (US)

( * ) Notice: Subject to any disclaimer, the term of this patent is extended or adjusted under 35 U.S.C. 154(b) by 154 days.

(21) Appl. No.: 15/449,566

(22) Filed: Mar. 3, 2017

(65) Prior Publication Data

US 2018/0252523 A1    Sep. 6, 2018

(51) Int. Cl.
*G01C 9/06* (2006.01)
*G01C 9/10* (2006.01)

(52) U.S. Cl.
CPC .............. *G01C 9/06* (2013.01); *G01C 9/10* (2013.01); *G01C 2009/064* (2013.01); *G01C 2009/107* (2013.01)

(58) Field of Classification Search
CPC .............. G01C 9/06; G01C 2009/064; G01C 2009/107; G01C 9/10
USPC .... 33/366.11, 366.25, 366.26, 368, 401, 402
See application file for complete search history.

(56) References Cited

U.S. PATENT DOCUMENTS

| | | | |
|---|---|---|---|
| 3,161,739 A * | 12/1964 | Suozzo | F16L 3/16 116/200 |
| 3,164,023 A | 1/1965 | Holderer | |
| 3,584,387 A | 6/1971 | Sturm | |
| 3,772,643 A | 11/1973 | Dodd et al. | |
| 3,774,314 A | 11/1973 | Youngs | |
| 3,791,042 A | 2/1974 | Bell | |
| 3,812,308 A * | 5/1974 | Bell | H01H 35/14 200/61.45 R |
| 3,816,680 A * | 6/1974 | Suzuki | H01H 35/14 200/238 |
| 3,908,471 A | 9/1975 | O'Connor et al. | |
| 3,984,918 A | 10/1976 | Chaney | |
| 4,135,067 A | 1/1979 | Bitko | |
| 4,178,492 A * | 12/1979 | Roesch | B60K 28/14 200/61.45 R |
| 4,278,854 A * | 7/1981 | Krause | H01H 35/027 200/52 A |
| 4,348,562 A | 9/1982 | Florin | |
| 4,493,155 A | 1/1985 | Comeau et al. | |
| 4,587,741 A | 5/1986 | Rorden et al. | |
| 4,618,746 A * | 10/1986 | Schwob | H01H 35/027 200/61.45 R |
| 4,866,379 A | 9/1989 | Odagawa et al. | |
| 4,899,132 A | 2/1990 | Stobbe et al. | |
| 4,942,274 A * | 7/1990 | Riback | H01H 35/186 200/61.52 |
| 4,972,595 A | 11/1990 | Shimamura et al. | |
| 5,202,559 A * | 4/1993 | Durst | G01C 9/06 200/61.45 R |

(Continued)

*Primary Examiner* — Justin Seo
*Assistant Examiner* — Tania C Courson
(74) *Attorney, Agent, or Firm* — Scott D. Swanson; Shaver & Swanson, LLP

(57) ABSTRACT

A tilt sensor for signaling when the tilt sensor is not vertical. The tilt sensor includes a metallic ball that is free to move and capable of resting at a low point when the tilt sensor is vertical. A proximity sensor directed at the low point communicates when the metallic ball has deviated from its position of repose, indicating that the sensor is no longer vertical.

20 Claims, 6 Drawing Sheets

(56) References Cited

U.S. PATENT DOCUMENTS

| | | | |
|---|---|---|---|
| 5,278,414 A * | 1/1994 | Samuelson | G01C 9/10 |
| | | | 250/206.1 |
| 5,428,219 A | 6/1995 | Cwalinski | |
| 5,639,999 A * | 6/1997 | Hsu | H01H 35/02 |
| | | | 200/61.52 |
| 5,941,836 A | 8/1999 | Friedman | |
| 6,018,130 A | 1/2000 | Haack et al. | |
| 6,301,795 B1 | 10/2001 | Kang | |
| 6,527,077 B2 | 3/2003 | Yamamoto et al. | |
| 6,559,396 B1 * | 5/2003 | Chou | H01H 35/02 |
| | | | 200/61.45 R |
| 6,664,534 B2 | 12/2003 | Hjertman et al. | |
| 6,690,457 B2 | 2/2004 | Yamaguchi | |
| 7,161,138 B2 | 1/2007 | Hsu | |
| 7,389,592 B2 | 6/2008 | Tsuruta et al. | |
| 7,882,923 B2 | 2/2011 | Yamamoto et al. | |
| 7,950,162 B2 | 5/2011 | Horio et al. | |
| 7,975,394 B2 | 7/2011 | Mollmer et al. | |
| 8,026,473 B2 | 9/2011 | Tanuma | |
| 2006/0218808 A1 | 10/2006 | Tsuruta et al. | |
| 2012/0281241 A1 | 11/2012 | Lai | |
| 2014/0231629 A1 | 8/2014 | Chou | |

* cited by examiner

TILT SENSOR

TECHNICAL FIELD

The presently disclosed technology relates to a tilt sensor. More particularly, the present invention uses an inductive sensor to indicate when the device has deviated from a vertical position.

BACKGROUND

Free flowing materials, such as grain, chemicals, and cement, among many others, are commonly dispensed into piles or containers for transportation, use, and/or storage. It is often inefficient and/or hazardous to use human labor to monitor the dispensing process to determine when to restrict or otherwise modify the flow. For example, chemical transport containers are often opaque, requiring a person to monitor the container capacity at close range, increasing the risk for exposure to hazardous materials. Thus, attempts have been made to monitor the dispensing process using mechanical methods, such as tilt-sensing devices.

Current tilt-sensing devices are problematic. For example, devices incorporating mercury switches are inherently dangerous due to the presence of mercury, limiting their application. Similarly, devices incorporating limit switches acted on by the weight of a ball contained within the device are inadequate as, in practice, the ball does not consistently trigger the switch as designed. These devices are prone to failure due to contamination and excess wear of certain components, such as the transmitting wires. Because these devices are largely self-contained and rigidly assembled, users are unable to disassemble the devices to attempt to repair them. Thus, a need exists for a reliable, repairable tilt-sensing device that is resistant to contamination and capable of automatically sensing the height of a free flowing material being dispensed and communicating when the material has reached a particular height.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

Disclosed is a tilt sensor for detecting when free flowing material being deposited has reached a point high enough in the container to cause the tilt sensor to tilt to one side. The tilt sensor may be hung from the top of the container and or otherwise suspended freely such as on a chain or cable, and is able to be tilted or pushed sideways when quantity of free flowing material fills the container to a high enough level. The free flowing material can be a powder, such as a fertilizer, a chemical, or material such as cement. The device can also be used with other free flowing solids, such as grain, potatoes, sugar beets, or any material which would tend to pile up as the container is filled. The device can also be used with liquids to be able to sense when a designated amount of liquid has been deposited into a container.

The tilt sensor includes a chamber defined by a top chamber end, a bottom chamber end, and one or more chamber walls connecting the top chamber end and the bottom chamber end. A first axis runs from the top chamber end to the bottom chamber end. The chamber may be constructed of various materials and be of assorted sizes and shapes. For example, the chamber may have a cylindrical interior and exterior, resulting in a single, annular chamber wall. Alternatively, the chamber may have multiple chamber walls with defined sides and edges, and a corresponding geometrically shaped interior. In yet another embodiment, the exterior of the chamber may appear to employ multiple chamber walls, but the interior of the chamber may be cylindrical. One skilled in the art will appreciate that additional configurations exist.

Depending on the size of the components to be used therein and the particular application, the chamber may be constructed using one or more pieces and, if more than one piece, may be assembled through standard methods such as complementary threading, machine pressing, nut and bolt fittings, etc. The chamber may be completely opaque, or may be constructed to allow visibility into the chamber to assess the operation of the internal components. This can be done by constructing one or more pieces or portions thereof with a resilient transparent material, such as a clear plastic.

The top chamber end serves as the upper limit of the chamber and may have a plurality of shapes interiorly and exteriorly. The bottom chamber end serves as the lower limit of the chamber and may have a variety of shapes exteriorly and interiorly. The exterior of the top chamber end and bottom chamber end may be configured to connect to an additional apparatus depending on how and where the tilt sensor is being used. For example, the exterior of the top chamber end may be configured to facilitate attachment of the tilt sensor to a conduit, hose, chain, hinge, or some other hanging mechanism. Similarly, the exterior of the bottom chamber end may be configured for attachment of a member capable of interacting with the free flowing material and initiating the tilt of the sensor when the free flowing solid reaches a predetermined height. Depending on the type of material being deposited, the bottom end of the member may have a particular configuration such as a paddle for certain types of solids, a float ball for certain types of liquids, etc. Other configurations and attachments will be apparent to those skilled in the art. Similarly, the hanging apparatus and member attached to the bottom chamber end may be of various lengths as needed.

Within the chamber is a low point. The low point may be defined by various structures and be positioned at one of various locations. For example, the interior floor of the bottom chamber end may be shaped like an inverted cone, with the inverted peak defining the low point. Alternatively, the interior floor of the bottom chamber end may be generally concave, hemispheric, parabolic, or may lack symmetry while still defining a low point. In alternative embodiments, the low point may be defined by a different structure positioned within the chamber between the top chamber end and the bottom chamber end.

The tilt sensor disclosed herein also includes a metallic ball able to move freely within the chamber and come to rest at the low point. The metallic ball is made of one or more different metals capable of being detected by an inductive sensor. The metallic ball as used herein need not be perfectly spherical and may include objects of various shapes and surface configurations, provided the metallic ball remains free to move about the chamber when acted upon by some external force such as gravity.

Changing the contours of the low point affects the mobility of the metallic ball and thus the sensitivity of the tilt sensor. For example, increasing the slope of the surfaces defining the low point increases the amount of tilt needed to displace the metallic ball from its point of repose. Decreasing the slope allows the metallic ball more freedom of movement. Thus, in other embodiments, the low point may be a separate component, such as a molded insert, that is able to be removed from the chamber and replaced with a low point with different contours, thereby changing the sensitivity of the tilt sensor.

As noted, the tilt sensor also contains an inductive sensor. The inductive sensor may be a non-contact electric proximity sensor and may be analog, digital, or some other type, and is capable of transmitting a signal when it senses the presence or absence of an object. The role of the inductive sensor is to identify whether and when the metallic ball has moved relative to the low point. When the sensor recognizes that the metallic ball has moved, the sensor transmits a signal indicating this event has occurred. Based on this signal, an operator may infer that the tilt sensor has deviated from a vertical position, or has otherwise been disturbed in such a way as to cause the metallic ball to move from its position of repose. In a preferred embodiment, the transmitting capability is integrated into the sensor, but it could be accomplished by a separate transmitting component in other embodiments. The signal may be a digital, analog, or of some other nature and may be transmitted in a variety of ways (wired or wireless). If the sensor uses some tangible material to transmit the signal (i.e. one or more wires), the chamber may include an aperture providing a mode of egress through which the signal will exit the chamber.

In operation, the inductive sensor is directed at the low point, allowing the sensor to perceive the presence or absence of the metallic ball. When at rest, the tilt sensor will be vertical and the metallic ball will be in repose at the low point and perceived by the inductive sensor. When the tilt sensor is sufficiently disturbed, the metallic ball will become displaced from its position of repose at the low point and no longer be perceived by the inductive sensor. When this occurs, the inductive sensor transmits a signal indicating that there has been a change in position of the metallic ball. An operator may infer that this indicates that the tilt sensor is no longer vertical.

It is within the disclosure of the invention that the inductive sensor may be secured in a functional position using some holding mechanism, such as an aperture or a recess, integrated into a chamber wall, the top chamber end, or the bottom chamber end. Alternatively, it may be preferable to employ a prox holder configured to securely hold and properly position the inductive sensor within the chamber itself. The prox holder can be constructed from assorted materials, such as metal or plastic, can be hollow or solid, and can take a variety of configurations. For example, the prox holder may be permanently integrated into the construction of the chamber. Alternatively, the prox holder may be able to be installed in and removed from an otherwise intact chamber, potentially allowing greater access to the inductive sensor. In one such configuration, the prox holder may take the form of one or more detachable support arms anchored to the interior of the chamber on one support arm end, and containing a mechanism for holding the inductive sensor on the other support arm end. Alternatively, the prox holder may be a broad body positioned across the chamber normal to the first axis, thereby severing the chamber into an upper sub-chamber, defined by the void within the chamber and above the prox holder, and a lower sub-chamber, defined as the void within the chamber and below the prox holder. In the case of a chamber with a cylindrical interior, the broad bodied prox holder may take the form of a circumferentially threaded circular disk capable of screwing into the interior of the chamber via complementary threading located on the interior of the chamber wall.

The tilt sensor may include a prox holder seat located within the chamber to serve as a limit or stopping point for a removable prox holder. For example, in the circular threaded prox holder configuration, a prox holder seat may be an edge located at the terminus of the threading on the interior of the chamber. When the circular prox holder is installed in the chamber using the complementary threading, the prox holder would come into contact with the prox holder seat and be prevented from traveling further into the chamber, completing installation.

Depending on the types of materials used to construct the prox holder and chamber, it may be desirable to provide a spacer between the prox holder and prox holder seat to prevent damage to the components and otherwise provide a proper fit between the prox holder and prox holder seat. For example, in the threaded circular prox holder configuration described above, if the prox holder is constructed of a relatively pliable plastic and the prox holder seat a rigid metal, an annular spacing mechanism may be inserted adjacent to the prox holder seat such that the prox holder may be properly installed within the chamber without risk of being damaged.

Because the tilt sensor is likely to be used in harsh environments, it may be necessary or desirable to protect the metallic ball and other components from interference or contamination by effectively sealing the chamber from infiltration by fluids or solids. Where the chamber is formed with more than one piece, this can be accomplished through the incorporation of seals, such as rubber o-rings, placed at the interface of the chamber pieces. If the metallic ball is contained within a sub-chamber, additional gaskets and seals may be used within the device to further protect the sub-chamber from infiltration.

Just as there are multiple approaches to secure the prox holder to, or within, the chamber, there are various ways one might secure the inductive sensor to, or within, the prox holder. As one example, the inductive sensor may be secured using complementary threading between the prox holder and the inductive sensor. Specifically, the prox holder may contain a recess with internal threading that is large enough to securely receive the inductive sensor. Correspondingly, complementary threading would surround the inductive sensor's exterior such that the inductive sensor could be securely threaded into the recess of the prox holder. While this threading technique is effective, other methods of fastening the inductive sensor to the prox holder may be used (clips, tabs, etc.)

The performance of an inductive sensor can be affected by the presence of particular materials, the sensor's distance from the target object, etc. Thus, care should be taken when designing the prox holder assembly so as to maximize performance of the inductive sensor. For example, referring to the disk shaped prox holder securing the inductive sensor through the use of complementary threading, assume the interior floor of the bottom chamber end is an inverted cone and the low point lies at the apex of the inverted cone. In such a case, the bottom surface of the prox holder may be designed to be complementary with the conical contour of the interior floor of the bottom chamber end, and the inductive sensor with transmitter may be attached to the prox holder via a recess on the top surface of the prox holder. Strategic placement and depth of the recess in the prox holder would allow the inductive sensor, when installed, to be placed at an operative distance from the metallic ball when in its state of repose, while still allowing the metallic ball to move freely about the terrain. Similarly, the inductive sensor should be positioned such that nothing inhibits its ability to sense the presence or absence of the metallic ball. For example, if the inductive sensor is embedded in the recess of the prox holder, the prox holder should be made of a material compatible with the inductive sensor so as not to inhibit its operation and accuracy.

When placing the inductive sensor in the prox holder, some minor adjustments to the position of the inductive sensor may be required. For example, upon threading the inductive sensor into the recess in the prox holder described above, one may want to fine-tune the depth of the inductive sensor and/or ensure it does not move from its position. One can employ an anchor to secure the inductive sensor in such a manner. While the type of anchor used will depend on the configuration of the prox holder and inductive sensor, an effective anchor in the embodiment described above would be a nut threaded around the installed inductive sensor until it abuts the prox holder.

As disclosed above, the different parts of the tilt sensor may be configured and located in multiple ways. For example, an embodiment disclosed herein describes the use of a circumferentially threaded prox holder with the inductive sensor with transmitter threaded into a recess in the top surface of the prox holder. The bottom surface of the prox holder is contoured to complement the interior floor of the bottom chamber end, which defines the low point. In an alternative embodiment, a threaded circular prox holder may be used, but the low point may be defined by the top surface of the prox holder, and the inductive sensor with transmitter may be inverted and threaded into a recess located on the bottom surface of the prox holder, with or without an anchor. In this configuration, the metallic ball would be located within the upper sub-chamber and come to repose on the top of the prox holder, and the interior floor of the bottom chamber end may be of any shape or even flat. Those skilled in the art will appreciate that other configurations (low point locations, prox holder designs, etc.) exist that allow the tilt sensor to function as disclosed herein.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

DETAILED DESCRIPTION OF THE PREFERRED EMBODIMENTS

Figure 1:
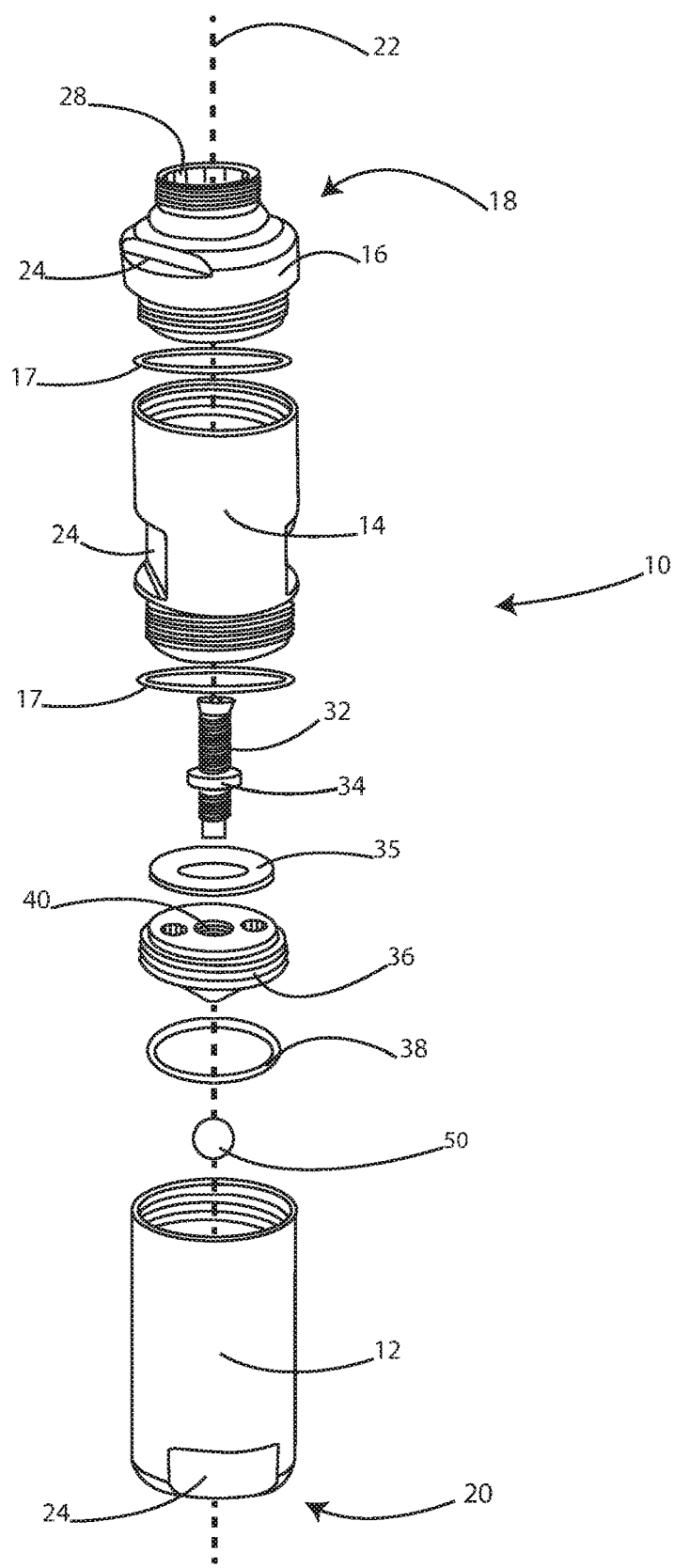
FIG. 1 is an exploded view of an embodiment of the tilt sensor.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 is an exploded view of one embodiment of the tilt sensor 10. In the embodiment shown, the main body of the tilt sensor 10 is constructed of three pieces: a ball carrier 12, a throat 14, and a cap 16. In this embodiment, the three pieces are connected through the use of complementary threading, though other methods of construction will be known to those skilled in the art. To prevent infiltration into the chamber of liquids, particulates, etc., chamber seals 17, such as rubber o-rings, are placed between the ball carrier 12 and throat 14, and throat 14 and cap 16.

The pieces are largely hollow such that, when assembled, they define a chamber 11. For example, in the embodiment shown, the ball carrier 12 is cylindrical in shape with a closed end and an open end. The throat 14 is also cylindrical, but open on both ends. The end of the cap 16 that engages with the throat 14 is open, while the other end of the cap 16 is tapered to form an aperture 28, as discussed below. Once assembled, this embodiment of the tilt sensor 10 forms a largely sealed cylindrical chamber with only an aperture 28 at the cap 16.

In the embodiment shown, the exterior surface of the ball carrier 12, throat 14, and cap 16 include depressions 24 designed to accommodate tools (wrenches, etc.) to assist in the assembly and disassembly of the pieces. Such depressions 24 are optional depending on the method of assembly of the pieces making up the main body of the tilt sensor. The underside of the ball carrier 12 may contain a threaded cavity 26 (shown in FIG. 2), or some other configuration capable of accommodating the attachment of a member (not shown), such as might be used to interact with the pile of free flowing solids accumulating below the tilt sensor 10. As mentioned, the cap 16 includes an aperture 28 through which the transmitter wires (not shown), if applicable, may pass. In the embodiment shown, the cap 16 also contains threads for attachment to a complementarily threaded conduit (not shown) from which the tilt sensor 10 hangs. Running the transmitting wires through a conduit or some other protective sheath provides additional protection from corrosion and general wear and tear. Other methods of attachments (hooks, holes for hooks, etc.) are known to those skilled in the art.

FIG. 1 also shows the inductive sensor 32, anchor 34, gasket 35, prox holder 36, and spacer 38, all of which are configured to be installed within the tilt sensor 10. The inductive sensor 32 is attached to the prox holder 36 through the use of complementary threading on the exterior of the inductive sensor 32 and the interior of a recess 40 in the top of the prox holder 36. Threaded around the inductive sensor 32 is an anchor 34, shown as a nut in the preferred embodiment, to secure the inductive sensor 32 in position after being attached to the prox holder 36.

Figure 3:
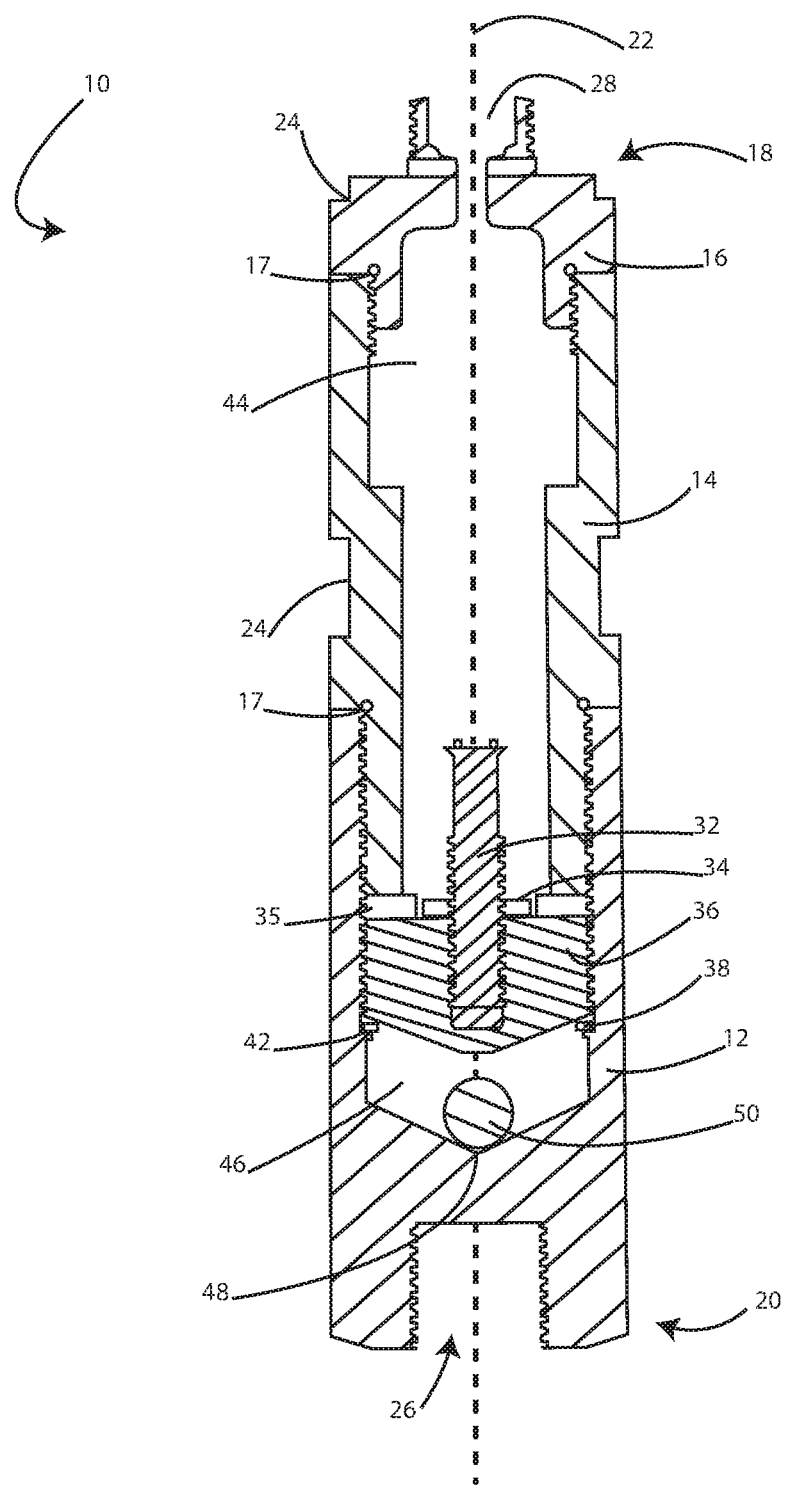
FIG. 3 is a cross section of an embodiment of the assembled tilt sensor in a vertical orientation.

Resting on top of the prox holder 36 is an annular gasket 35 that, when the tilt sensor 10 is assembled, helps to seal off the lower sub-chamber 46 containing the metallic ball 50. In the embodiment shown, when the prox holder 36 is fully recessed into the ball carrier 12 and the throat 14 is connected to the ball carrier 12, a small gap remains between the top surface of the prox holder 36 and the bottom of the walls of the throat 14. Placing an annular gasket 35 made of neoprene or some other pliable, resilient material of sufficient thickness around the inductive sensor 32 and on top of the prox holder 36 causes the gasket 35 to be compressed between the top of the prox holder 36 and the bottom of the throat 14, thereby sealing the lower sub-chamber 46 when the tilt sensor 10 is fully assembled. This is best seen in FIG. 3. Also shown is the spacer 38 positioned between the bottom edge of the prox holder 36 and the prox holder seat 42 (shown in FIG. 3 and discussed below) located on the interior of the tilt sensor 10.

Figure 2:
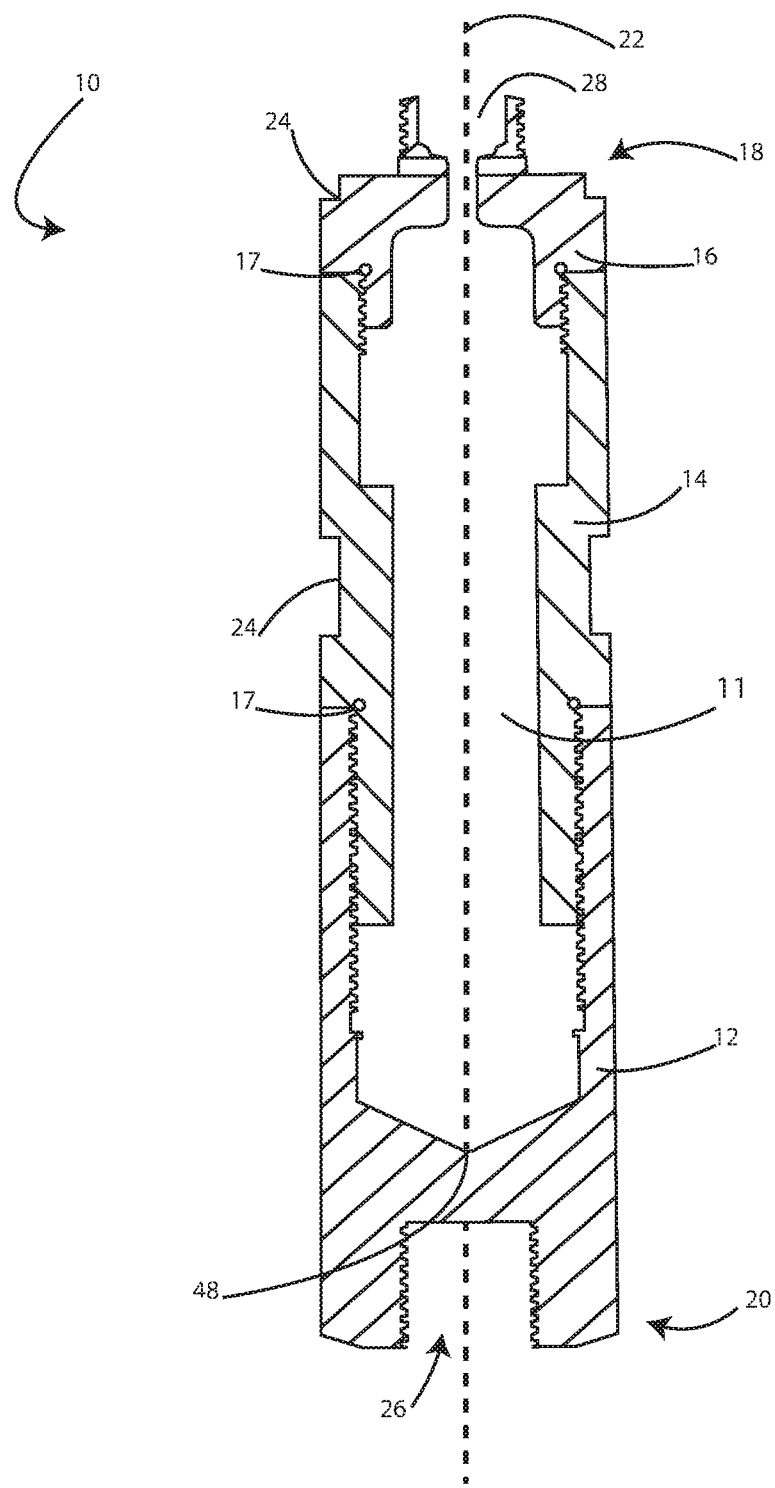
FIG. 2 is a cross section of the assembled main body of the tilt sensor to depict the chamber defined by the tilt sensor.

FIG. 2 is a cross section of the tilt sensor 10 wherein the ball carrier 12, throat 14, and cap 16 are assembled and in the vertical position. Once assembled, the ball carrier 12, throat 14, and cap 16 serve as one or more chamber wall(s) and define the chamber 11. The region of the tilt sensor 10 where the cap 16 is located is generally known as the top chamber end 18. The opposing end of the tilt sensor 10 is known as the bottom chamber end 20. A first axis 22 extends from the bottom chamber end 20 to the top chamber end 18. FIG. 2 also depicts the chamber seals 17 positioned at the interfaces between the ball carrier 12 and throat 14, and throat 14 and cap 16.

FIG. 2 also demonstrates how, in the embodiment shown, the ball carrier 12, throat 14, and cap 16 are assembled through complementary threading. Also shown is the threaded cavity 26 located at the bottom chamber end 20 to which can be attached a member (not shown) capable of interacting with the freely flowing solid while the tilt sensor 10 is operating. Though the cavity is threaded for attachment of a member, other methods of attaching a member to the tilt sensor 10 are known to those skilled in the art.

FIG. 3 is a cross section of the fully assembled tilt sensor 10 in the vertical positon. FIG. 3 depicts the prox holder 36 installed within the chamber 11 through complementary threading on the exterior circumference of the prox holder 36 and the interior chamber wall of the ball carrier 12. Because the prox holder 36 in the embodiment shown is a disk shaped body and designed to thread into the ball carrier 12, when the prox holder 36 is installed, the chamber 11 is severed into an upper sub-chamber 44, defined by the void within the chamber and above the prox holder 36, and a lower sub-chamber 46, defined by the void within the chamber and below the prox holder 36.

The threading on the interior wall of the ball carrier 12 stops before encountering the interior floor of the lower sub-chamber 46. Where the threading terminates is located a prox holder seat 42, upon which rests the spacer 38 which allows the prox holder 36 to be fully installed into the ball carrier 12 while preventing damage to the components. The gasket 35 is located on top of the prox holder 36 and forms a seal between the prox holder 36 and the bottom of the throat 14, thereby protecting the lower sub-chamber 46 from contamination.

In the embodiment shown, the low point 48 is located in the lower sub-chamber 46 on the interior floor of the lower sub-chamber 46, which is shaped like an inverted cone. A metallic ball 50 is situated at the low point 48, its point of repose when the tilt sensor 10 is vertical, as shown in FIG. 3. This vertical position will be designated Position 1. Though shown in repose in Positon 1, the metallic ball 50 remains free to move about the lower sub-chamber 46 and deviate from the low point 48 when acted on by an eternal force such as gravity.

As shown in FIG. 3, when the tilt sensor 10 is fully assembled, the inductive sensor 32 is installed in the prox holder 36 and directed at, and positioned sufficiently close to, the low point 48 such that the inductive sensor 32 can detect the presence or absence of the metallic ball 50. In this embodiment, the bottom of the prox holder 36 is conical in shape so as to complement the interior floor of the lower sub-chamber 46, thereby allowing the inductive sensor 32 to be positioned sufficiently close to the metallic ball 50 when it is at its point of repose.

Figure 4:
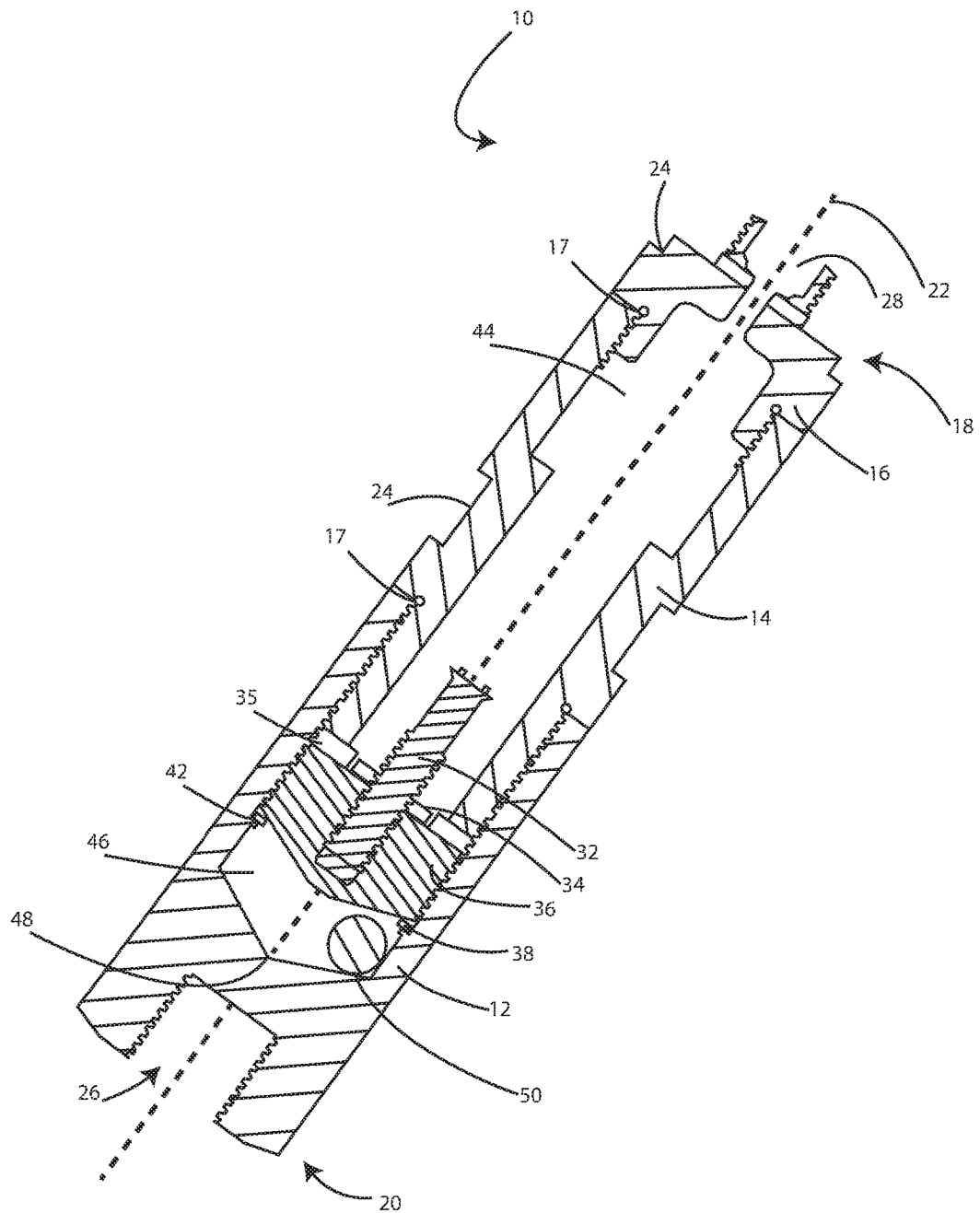
FIG. 4 is a cross section of an embodiment of the assembled tilt sensor in a tilted orientation.

FIG. 4 is the cross section of the tilt sensor 10 in a tilted position, designated Position 2. FIG. 4 demonstrates that, when the tilt sensor 10 is tilted from a vertical position, the metallic ball 50 is capable of moving to a new location due to gravitational forces. When moving from the low point 48, the metallic ball 50 is no longer detectable by the inductive sensor 32, which will result in a change in the signal being transmitted from the inductive sensor 32.

Figure 5:
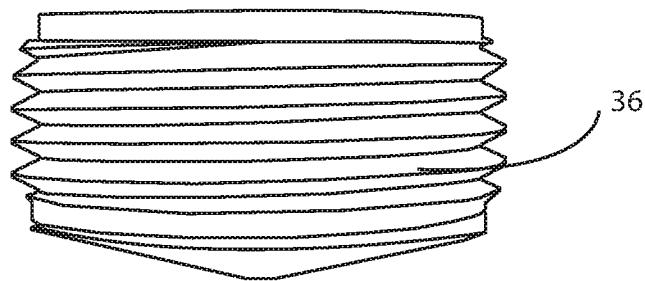
FIG. 5 is a side view of an embodiment of a prox holder.

FIG. 5 is a side view of the prox holder 36 used in the embodiment shown. FIG. 5 provides another view of the conical shape of the bottom of the prox holder 36 as well as the threading surrounding the prox holder 36 used to install the prox holder 36 into the bottom 12 of the tilt sensor 10.

Figure 6:
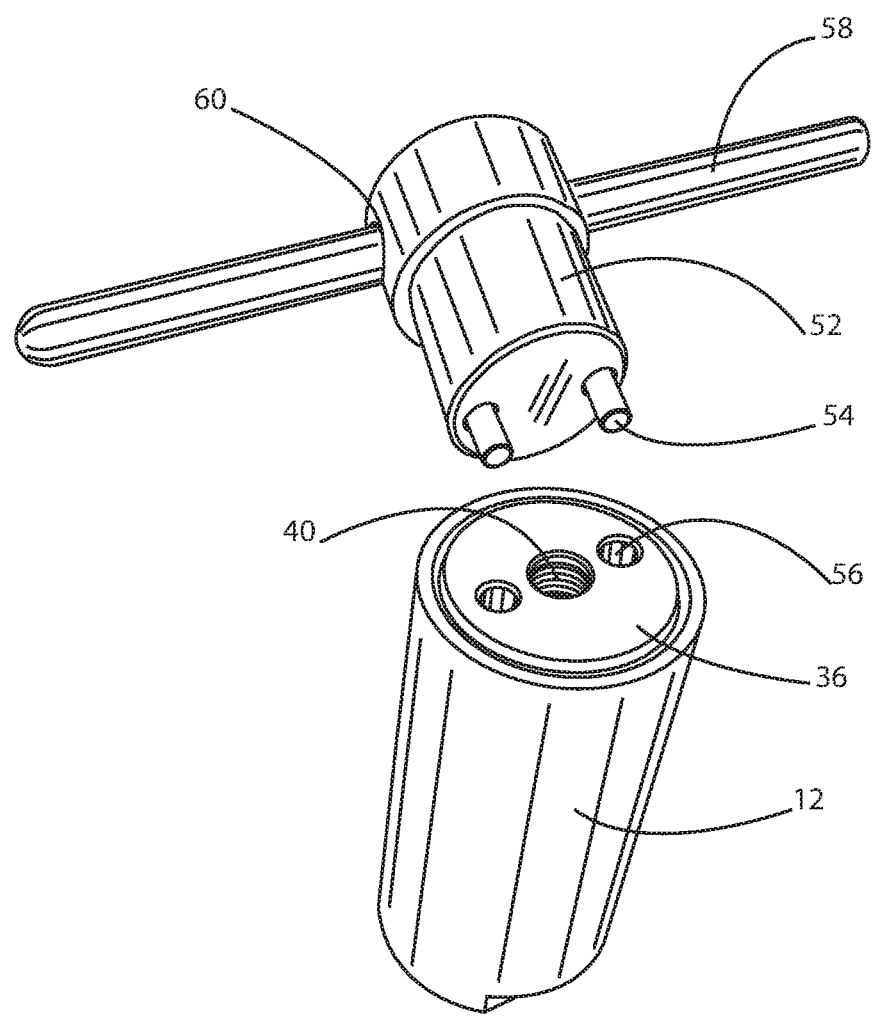
FIG. 6 is a perspective view of the lower portion of the tilt sensor with a prox holder partially installed, as well as an embodiment of a tool used to install the prox holder.

Depending on the general size and configuration of the tilt sensor 10 and its component parts, it may be necessary to use specialized tools to assemble the tilt sensor 10, or install and remove the component parts. While these tools are not relevant to the operation of the tilt sensor 10 once assembled, exemplary tools used to install and remove the prox holder 36 in a preferred embodiment are identified in FIG. 6 and described herein.

In the embodiment shown in FIGS. 1, 3, and 4, fully installing the prox holder 36 until it is in contact with the spacer 38 and prox holder seat 42, and then removing it from this position, may be problematic because of the close fit between the prox holder 36 and the interior wall of the ball carrier 12 of the tilt sensor 10, and the relative depth of the prox holder seat 42 within the ball carrier 12. To assist with placement and removal of the prox holder 36, an extension 52 may be used to engage with and install the prox holder 36 as it retreats within the ball carrier 12 and becomes more difficult to turn by hand. While many equally effective approaches will be known to those skilled in the art, in the embodiment shown, the extension 52 includes two pegs 54 capable of engaging with two alcoves 56 within the top surface of the prox holder 36. Once the extension 52 is engaged with the prox holder 36, a mechanism to turn the extension, and therefore the prox holder 36, is used to complete installation or removal of the prox holder 36. In the embodiment shown, the extension is turned by inserting a bar 58 through a transverse hole 60 contained within the extension. The extension 52 is sufficiently narrow as to fit within the ball carrier 12 so as to allow the prox holder 36 to be fully installed in the ball carrier 12 of the tilt sensor 10. This process can be reversed to remove the prox holder 36 when desired.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

The invention claimed is:

1. A tilt sensor configured to detect when the tilt sensor is not vertical, comprising:
   a chamber defined by a top chamber end, a bottom chamber end, a first axis running from said top chamber end to said bottom chamber end, and one or more chamber walls connecting said top chamber end and said bottom chamber end;
   a low point located within said chamber;
   a metallic ball within said chamber, said metallic ball free to move about said chamber such that, when said first axis is vertical, said metallic ball will come to rest at said low point; and
   an inductive sensor, said inductive sensor attached to said chamber and directed at said low point such that, wherein said inductive sensor is configured such that when said first axis is vertical said inductive sensor detects the presence of said metallic ball in said low point;
   wherein, said inductive sensor is configured such that upon failing to detect the presence of said metallic ball, said inductive sensor transmits a signal that said metallic ball is not in said low point.

2. The tilt sensor of claim 1 wherein said inductive sensor is attached to a prox holder configured to securely hold said inductive sensor.

3. The tilt sensor of claim 2 wherein said prox holder is located within said chamber.

4. The tilt sensor of claim 3 wherein said prox holder is removable from said chamber.

5. The tilt sensor of claim 1 wherein said low point is located on an interior surface of said bottom chamber end.

6. The tilt sensor of claim 5 wherein said low point is defined as the apex of an inverted cone.

7. The tilt sensor of claim 1 wherein the interior of said chamber is cylindrical.

8. The tilt sensor of claim 1 wherein said chamber includes an aperture providing egress for the transmission of said signal.

9. A tilt sensor configured to detect when the tilt sensor is not vertical, comprising:
   a chamber having a cylindrical interior and defined by a top chamber end, a bottom chamber end, a first axis running from said top chamber end to said bottom chamber end, and one or more chamber walls connecting said top chamber end and said bottom chamber end;
   a low point contained in an interior surface of said bottom chamber end, said low point being defined as the apex of an inverted cone;
   a metallic ball within said chamber, said metallic ball free to move about said chamber such that, when said first axis is vertical, said metallic ball will come to rest at said low point;
   a prox holder configured to securely hold an inductive sensor, said prox holder positioned within said chamber and removable from said chamber; and
   said inductive sensor securely attached to said prox holder, said prox holder located within said chamber such that said inductive sensor is directed at said low point and configured such that when said first axis is vertical said inductive sensor detects the presence of said metallic ball;
   wherein said inductive sensor is configured such that upon failing to detect the presence of said metallic ball, said inductive sensor transmits a signal that said metallic ball is not in said low point.

10. The tilt sensor of claim 9 wherein said prox holder is positioned within said chamber and normal to said first axis such that, when installed, said prox holder severs the interior of said chamber, defining a lower sub-chamber defined by the void within said chamber and below said prox holder and an upper sub-chamber defined by the void within said chamber and above said prox holder, wherein said low point and said metallic ball both being contained in either the upper sub-chamber or the lower sub-chamber.

11. The tilt sensor of claim 10 wherein a recess is defined within one of said top surface or said bottom surface of said prox holder and said inductive sensor is secured by said prox holder through the use of complimentary threading within said recess and surrounding the outer surface of said inductive sensor.

12. The tilt sensor of claim 11 wherein the installed depth of said inductive sensor relative to said recess is controlled through the use of an anchor.

13. The tilt sensor of claim 12 wherein said anchor is a nut threaded around said inductive sensor and abutting said prox holder.

14. The tilt sensor of claim 11 wherein the metallic ball is contained in said lower sub-chamber, said low point is defined by said interior of said bottom chamber end, the bottom surface of said prox holder has a contour complementary to the interior of said bottom chamber end, and the top surface of said prox holder contains said recess designed to receive said inductive sensor.

15. The tilt sensor of claim 11 wherein the metallic ball is located in said upper sub-chamber, the low point is defined by the top surface of said prox holder, and the bottom surface of said prox holder contains a recess designed to receive said inductive sensor.

16. The tilt sensor of claim 10 wherein the interior of said one or more chamber walls and the circumference of said prox holder are complementarily threaded to allow for installation and removal of said prox holder.

17. The tilt sensor of claim 16 wherein at the terminus of the threads on the interior of said one or more chamber walls is located a prox holder seat configured to prevent said prox holder from traveling further into said chamber.

18. The tilt sensor of claim 10 wherein a spacer is located between said one or more chamber walls and said prox holder such the material integrity of the prox holder and the chamber walls is preserved.

19. The tilt sensor of claim 10 wherein a gasket is placed between said one or more chamber walls and said prox holder to prohibit the infiltration of fluids and solids between said lower sub-chamber and said upper sub-chamber.

20. A tilt sensor configured to detect when the tilt sensor is not vertical, comprising:
   a chamber having a cylindrical interior and defined by a top chamber end, a bottom chamber end, a first axis running from the top chamber end to the bottom chamber end, and one or more chamber walls connecting said top chamber end and said bottom chamber end;
   a low point located on an interior surface of said bottom chamber end, said low point being defined as the apex of an inverted cone;
   a prox holder being circular in shape and located within said chamber normal to said first axis, configured to securely hold an inductive sensor, wherein the top surface of said prox holder contains a recess designed to receive an inductive sensor, and wherein the bottom surface of said prox holder has a contour complementary to said interior surface of said bottom chamber end;

said prox holder being removable via complimentary threading located along the circumference of said prox holder and the interior of said one or more chamber walls such that, when installed, said prox holder severs the interior of said chamber, creating a lower sub-chamber defined by the void within said chamber and below said prox holder, and an upper sub-chamber, defined by the void within said chamber and above said prox holder, a prox holder seat located at the terminus of the threading on the interior of said one or more chamber walls preventing said prox holder from traveling further into said chamber;

a spacer located between said one or more chamber walls and said prox holder such the material integrity of the prox holder and the chamber walls is preserved;

a gasket positioned between said one or more chamber walls and said prox holder such that said lower sub-chamber is impermeable to fluids and solids;

a metallic ball within said lower sub-chamber, said metallic ball free to move about said lower sub-chamber such that, when said first axis is vertical, said metallic ball will come to rest at said low point;

an inductive sensor installed in said prox holder through the use of complimentary threading within said recess in the top surface of said prox holder and surrounding the outer surface of said inductive sensor;

a nut threaded around said inductive sensor and abutting the top surface of said prox holder, said nut used to adjust and maintain the position of said inductive sensor relative to said recess; and said prox holder with attached inductive sensor positioned within said chamber such that said inductive sensor is directed at said low point such that, wherein said inductive sensor is configured such that when said first axis is vertical said inductive sensor detects the presence of said metallic ball;

wherein said inductive sensor is configured such that upon failing to recognize the presence of said metallic ball, said inductive sensor transmits a signal that said metallic ball is not in said low point.

* * * * *